July 28, 1964 A. B. GARNICH 3,142,400
FORK EXTENDING AND SIDE SHIFTING CONSTRUCTION
Filed Oct. 9, 1961 5 Sheets-Sheet 1
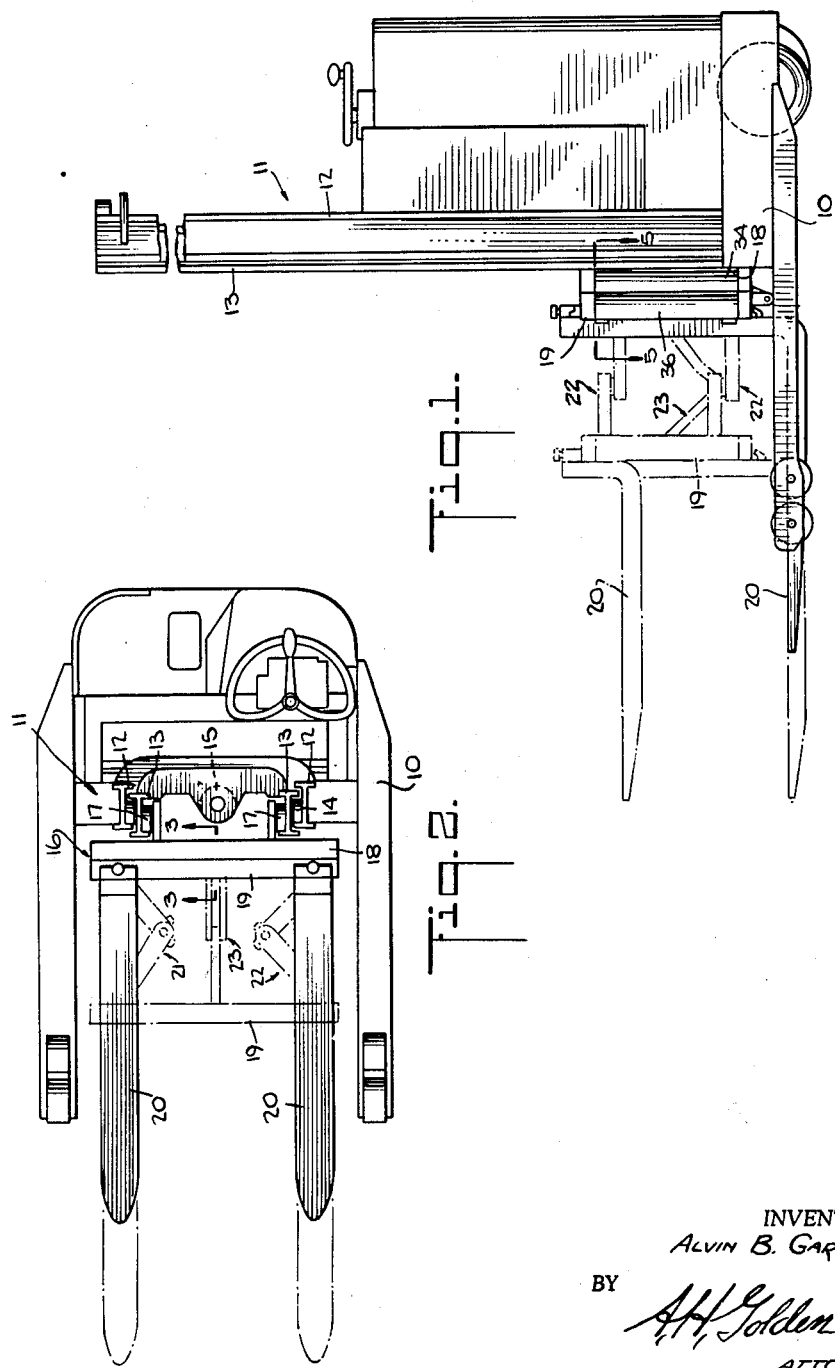
INVENTOR.
ALVIN B. GARNICH
BY
A. H. Golden
ATTORNEY

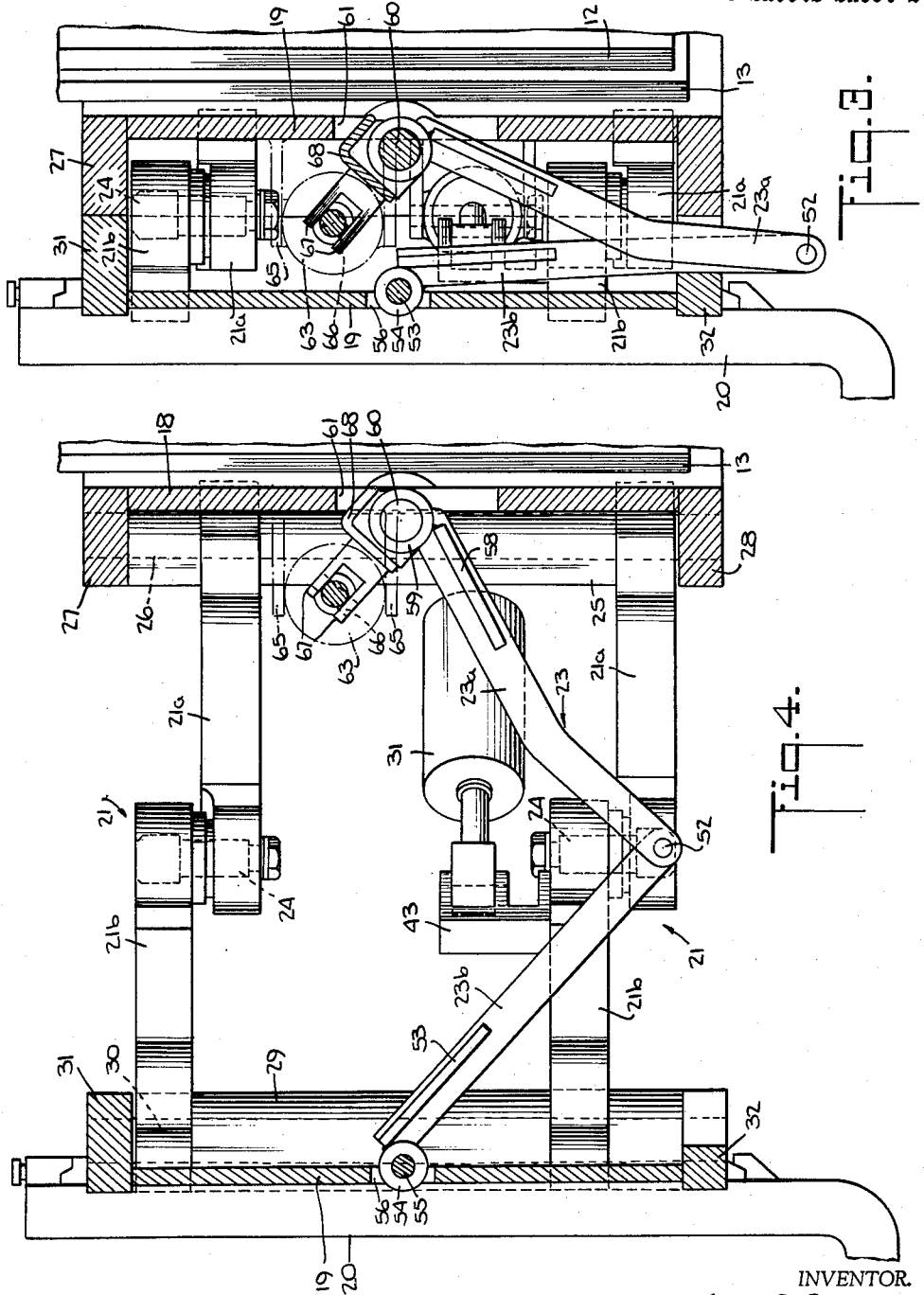

July 28, 1964　　　A. B. GARNICH　　　3,142,400
FORK EXTENDING AND SIDE SHIFTING CONSTRUCTION
Filed Oct. 9, 1961　　　　　　　　　　5 Sheets-Sheet 3
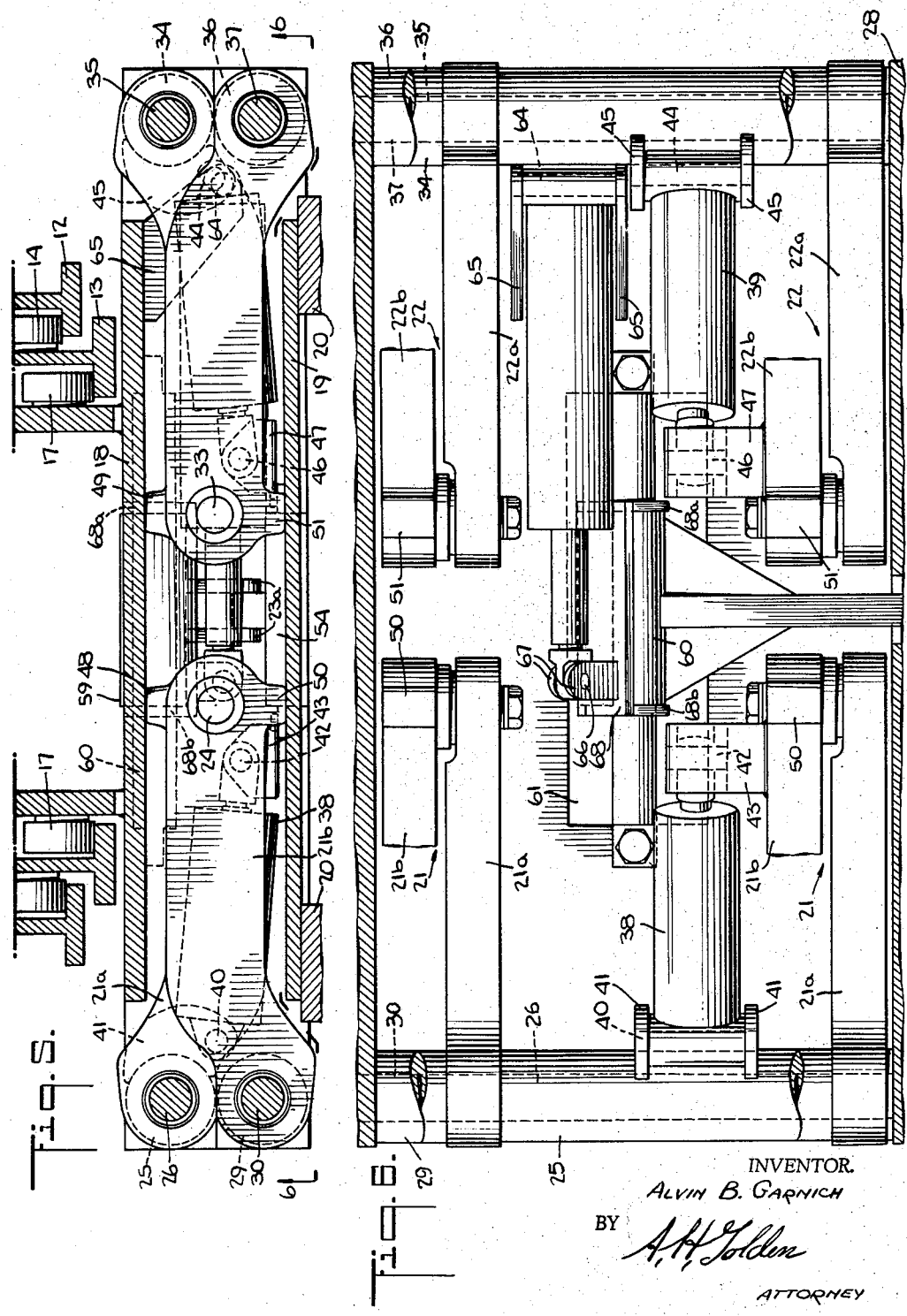
INVENTOR.
ALVIN B. GARNICH
BY
ATTORNEY

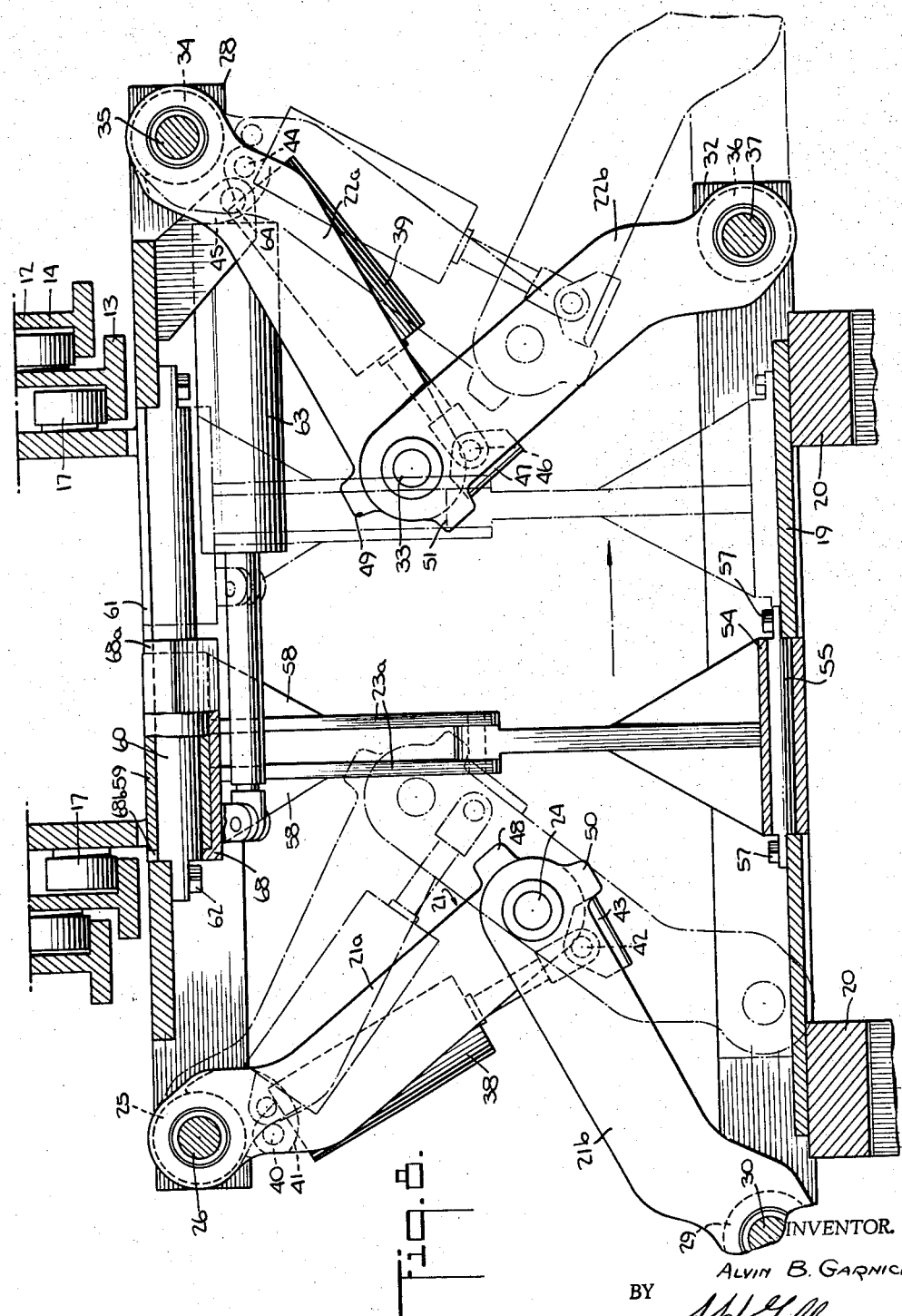

United States Patent Office 3,142,400
Patented July 28, 1964

3,142,400
FORK EXTENDING AND SIDE SHIFTING
CONSTRUCTION
Alvin B. Garnich, Eddington, Pa., assignor to Yale and
Towne, Inc., New York, N.Y., a company of Ohio
Filed Oct. 9, 1961, Ser. No. 143,728
9 Claims. (Cl. 214—730)

This invention relates to a lift truck having a load support, preferably in the form of forks, which may be extended outwardly of the truck and which also may be shifted sideways of the truck.

The advantages of being able to extend the forks of a lift truck outwardly of the truck and also to side shift the forks are well known and various constructions for providing such movements of the forks have been proposed. Such constructions, however, are quite complicated and are expensive to construct and maintain. Further, the side shifting arrangements of such constructions do not provide for automatic centering of the load forks as the forks are retracted. Accordingly, the forks must be intentionally shifted by a separate operation in order to center the forks relatively to the truck to provide desired stability and to minimize lateral overhanging of a load on the forks when the forks are retracted.

The purpose of this invention is to provide an improved construction for providing both extending and side shifting movement of the load platform or forks of a lift truck, which is not only much simpler and less expensive than constructions heretofore proposed, but which also provides automatic centering of the forks relatively to the truck as the forks are retracted.

In accordance with the invention, the load platform or forks are mounted on laterally spaced pairs of folding arms and means are provided for either folding the arms or swinging both the arms laterally in the same direction. By this arrangement, the forks may be extended and retracted by folding of the arms, and the forks may be side shifted by lateral swinging of the arms. If the forks, while extended, are side shifted, they are automatically again centered relatively to the truck when the arms are folded against the truck to retract the forks. As the forks are supported by the same arms during both extending movement and side shifting movement, separate guiding and supporting structures for guiding and supporting the forks during the two different movements are not necessary, thus greatly simplifying the structure of the truck.

The invention and its advantages having been broadly described, a more detailed description of one embodiment of the invention is given hereafter by reference to the accompanying drawings, wherein:

FIG. 1 is a side elevational view of a lift truck incorporating the fork extending and side shifting arrangement of the invention, showing the forks in a retracted position in solid lines and in an extended position in broken lines;

FIG. 2 is a top plan view of the truck shown in FIG. 1;

FIG. 3 is a sectional view taken on the lines 3—3 of FIG. 2;

FIG. 4 is a view similar to that of FIG. 3, but showing the forks extended;

FIG. 5 is a sectional view taken on the lines 5—5 of FIG. 1;

FIG. 6 is a view taken on the lines 6—6 of FIG. 5;

FIG. 8 is a view similar to that of FIG. 7, but showing in solid lines the forks side shifted to the left, and showing in broken lines the forks side shifted to the extreme right.

Figure 7:
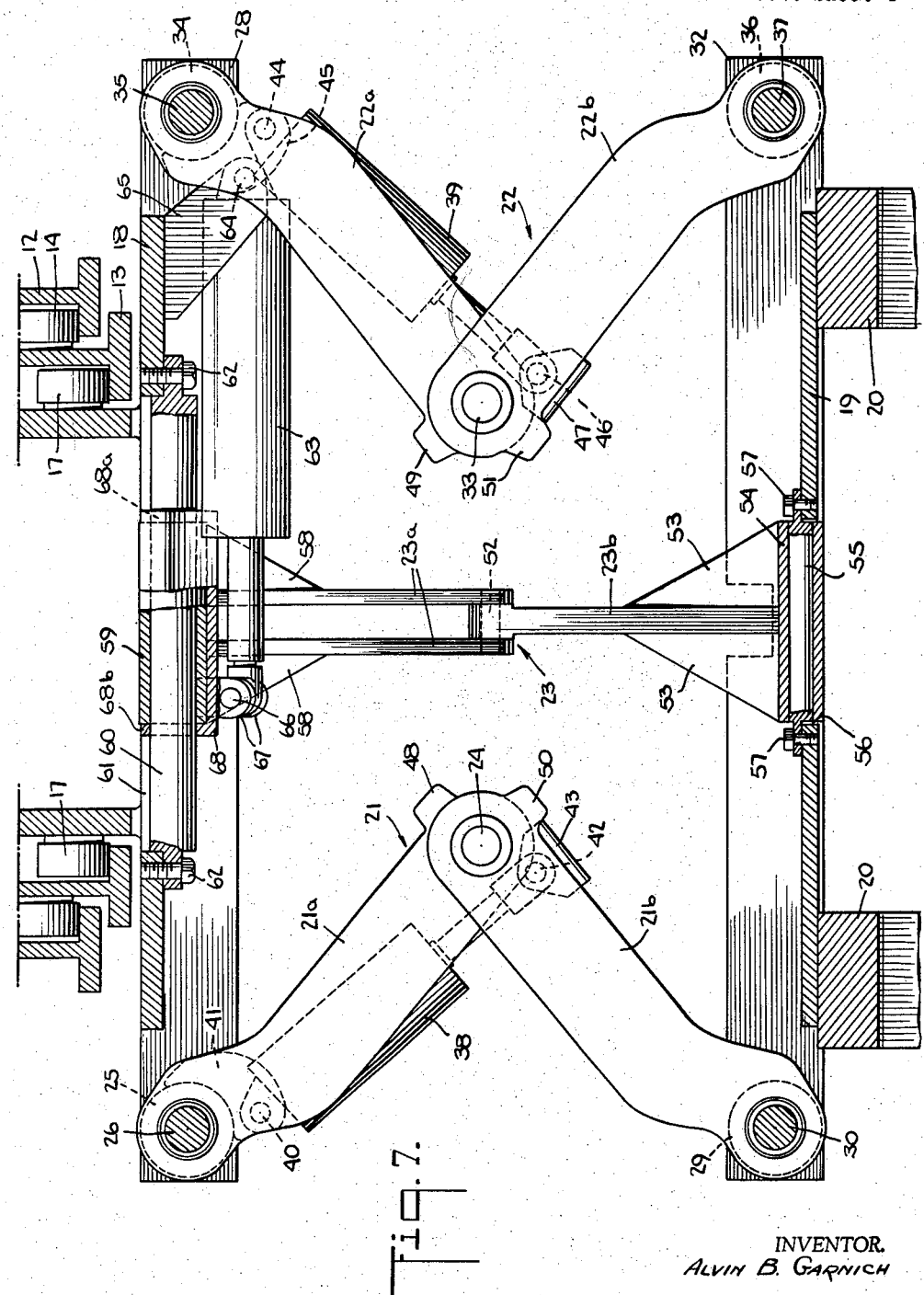
FIG. 7 is a view similar to that of FIG. 5, but showing the forks partially extended in a centered position.

Referring to the drawings, and in particular to FIGS. 1 and 2, a fork extending and side shifting arrangement constructed in accordance with the invention is shown applied to a lift truck of the straddle leg type. It will be appreciated that while the invention is described hereafter in connection with such a type of truck, the invention is also equally applicable to other types and styles of lift trucks.

It is sufficient to an understanding of the invention to point out that the truck illustrated includes a wheeled chassis 10 on which is mounted a mast structure, generally designated by the reference numeral 11. The mast structure includes a pair of primary or stationary channeled uprights 12 and a pair of secondary uprights 13 which are mounted for vertical movement on the primary uprights 12 by rollers 15. The secondary uprights 13 are movable vertically on the primary uprights 12 by a suitable elevating ram 15 (FIG. 2) in the conventional manner.

A load carriage, generally designated by the reference numeral 16, is mounted for vertical movement on the secondary uprights 13 by rollers 17 which are secured to a base plate 18 which forms a part of the load carriage 16. The load carriage 16 is adapted to be elevated by the ram 15 through chains (not shown) in the well-known manner. A load or fork plate 19 on which load supporting forks 20 are carried is mounted in front of the base plate 18.

In accordance with the invention, the fork plate 19 is mounted on the base plate 18 at one side by means of a pair of upper and lower folding arms 21 and at the opposite side by a pair of upper and lower folding arms 22, each of which is hinged to fold intermediate its ends and is pivotally secured at each end by a vertical pivot to the base plate 18 and to the fork plate 19. This allows the fork plate 19 to be extended and retracted relatively to the base plate 18 by folding of the arms 21 and 22, and also allows side shifting of the fork plate 19 relatively to the base plate 18 by swinging movement of both arms 21 and 22 sideways in the same direction. In FIG. 1, the forks 20 are shown in solid lines in a retracted position, and in broken lines in both a partially extended, lowered position and a partially extended, raised position. A control arm 23, hinged to fold about a horizontal pivot and pivotally attached at its ends by horizontal pivots to the base plate 18 and to the fork plate 19 serves, as will be described in detail hereafter, to maintain parallelism between the base plate 18 and the fork plate 19, and also serves as a connection through which side shifting movement may be transmitted to the fork plate 19 from a ram mounted on the base plate.

As best shown in FIG. 4, each of the folding arms 21 is conveniently formed of two parts, 21a and 21b, which overlap at their ends and are pivoted together by means of a pivot pin 24. The opposite ends of the parts 21a of the upper and lower arms 21 are welded, or otherwise rigidly secured, to a vertically extending cylindrical sleeve or bearing 25. The bearing 25 in turn is journaled on a vertically extending pivot shaft 26 which is secured at top and bottom to bars 27 and 28 formed integrally with, or otherwise rigidly attached to, the top and bottom of the base plate 18. In this manner, the upper and lower arms 21 are pivotally attached to the base plate 18 for horizontal swinging movement about the vertical pivot shaft 26. The opposite ends of the parts 21b of the upper and lower arms 21 are similarly pivotally attached to the fork plate 19 by means of a cylindrical sleeve or bearing 29 which is journaled on a vertically extending pivot shaft 30. Pivot shaft 30 in turn is secured at its ends to bars 31 and 32 formed integrally with, or otherwise rigidly attached to, the top and bottom of the fork plate 19.

As best shown in FIGS. 6 and 7, each of the folding arms 22 supporting the opposite side of the fork plate 19 is similarly formed of two parts, 22a and 22b, of the same lengths as the parts 21a and 21b of arms 21. The two parts 22a and 22b overlap at their ends and are pivoted together by a pivot pin 33. The opposite ends of the parts 22a of the upper and lower arms 22 are pivotally secured to the base plate 18 through a cylindrical sleeve 34 which is journaled on a vertically extending pivot shaft 35 secured at the top and bottom to the bars 27 and 28. The opposite ends of the parts 22b of both the upper and lower arms 22 are pivotally secured to the fork plate 19 by means of a cylindrical sleeve or bearing 36 which is journaled on a vertically extending pivot shaft 37 secured at its top and bottom to the bars 31 and 32. As best shown in FIG. 7, the lateral spacing between the pivot shaft 26 and 35 on the base plate 18 is the same as the lateral spacing between the pivot shafts 30 and 37 on the fork plate 19 whereby a parallel linkage arrangement is provided permitting parallel movement of the fork plate 19 relatively to the base plate 18 during side shifting of the fork plate 19 and forks 20 through swinging of the arms 21 and 22 in one direction or the other.

Folding movement of the arms 21 and 22 to retract or extend the fork plate 19 relatively to the base plate 18 is effected by fluid rams 38 and 39. As best shown in FIGS. 6 and 7, the ram 38 is pivotally attached at one end by a pivot pin 40 to spaced ears 41 formed integrally with, or rigidly secured to, the bearing 25 which is mounted on the vertical pivot shaft 26. The other end of the ram 38 is pivotally attached by means of a pivot pin 42 to a bracket 43 which is rigidly secured to the part 21b of the arm 21. Ram 39 is similarly pivotally secured at one end by a pivot pin 44 to spaced ears 45 formed integrally with, or rigidly secured to, the bearing 34 which is mounted on the vertical pivot shaft 35. The other end of the ram 39 is pivotally secured by pivot pin 46 to a bracket 47 which is rigidly secured to the part 22b of the arm 22.

Admission of fluid to the rams 38 and 39 to extend both the rams simultaneously, therefore, effects folding movement of the arms 21 and 22 to extend the fork plate 19 and forks 20 relatively to the base plate 18, and admission of fluid to the rams 38 and 39 to simultaneously contract the rams serves to retract the fork plate 19 and forks 20 relatively to the base plate 18 until the fork plate 19 is in a fully retracted position, as shown in FIGS. 3 and 5. When the fork plate 19 is fully retracted, the parts 21b and 22b completely overlie the parts 21a and 22a of the arms 21 and 22, and stop lugs 48 and 49, provided on parts 21a and 22a respectively of arms 21 and 22, engage the base plate 18, while lugs 50 and 51 provided on the parts 21b and 22b of arms 21 and 22, engage the fork plate 19, as best shown in FIG. 5.

As best shown in FIGS. 4 and 7, the control arm 23 is formed of two parts, 23a and 23b, hinged together by a horizontal pivot pin 52. The opposite end of the part 23b is reinforced by plates 53 and rigidly secured to a horizontal bearing sleeve 54. Bearing sleeve 54 in turn is rotatably mounted on a horizontally disposed pivot shaft 55 mounted in an opening 56 in the fork plate 19 and secured at each end to the fork plate 19 by means of screws 57. The opening 56 is substantially the same length as the bearing sleeve 54 so that bearing sleeve 54 while free to rotate on shaft 55 is prevented by the edges of the opening 56 from shifting transversely. The other end of the part 23a of the arm 23 is reinforced by plates 58 and rigidly secured to a cylindrical bearing sleeve 59. Bearing sleeve 59 in turn is rotatably mounted on a horizontally disposed pivot shaft 60 mounted in an opening 61 of the base plate 18 and secured at each end to the base plate 18 by screws 62. The horizontal pivots of the arm 23 allow the arm 23 to fold in a vertical plane to permit extending and retracting movement between the fork plate 19 and the base plate 18 while the arm 23 at the same time prevents twisting of the fork plate 19 about a vertical axis relatively to the base plate 18 due to any unequal operation of the rams 38 and 39 for any reason. Thus, the arm 23 serves to maintain parallelism between the fork plate 19 and base plate 18 during extension and retraction of the fork plate 19.

Still referring to FIG. 7, it will be noted that the pivot shaft 60 and the opening 61 are considerably longer than the bearing sleeve 59, so that the bearing sleeve 59 may slide on the shaft 60 in a direction transversely of the truck. It will also be appreciated that such sliding movement of the bearing sleeve 59 will be transmitted through arm 23 to the fork plate 19 to cause transverse, side shifting movement thereof through lateral swinging of the arms 21 and 22. This is illustrated in FIG. 8, in which the bearing sleeve 59 is shown in solid lines shifted to an extreme position to the left with resulting shifting of the fork plate 19 and forks 20 to the left through a swinging of the arms 21 and 22, and in which the bearing 59 is shown in broken lines shifted to an extreme position to the right with a resulting side shifting of the fork plate 19 and forks 20 to the right. During such side shifting, the fork plate 19 is maintained parallel to the base plate 18 by the arm 23.

Such sliding movement of the bearing sleeve 59 to side shift the fork plate 19 and the forks 20 is effected by means of a ram 63 which is connected at one end by means of a pivot pin 64 to a bracket 65. Bracket 65 in turn is secured to the base plate 18. The other end of the ram 63 is pivotally connected by means of a pivot pin 66 to ears 67 which are secured to a yoke member 68. The yoke member 68 has ends 68a and 68b which surround the shaft 60 and engage the ends of the bearing 59 so that movement of the ram 63 in either direction is transmitted to the bearing 59, while allowing the bearing 59 to pivot or rotate on the shaft 60 as necessary to allow folding movement of the arm 23. Thus, through control of fluid to the ram 63, the bearing 59 may be held stationary to lock the fork plate 19 and the forks 20 against side shifting movement, or the bearing 59 may be moved on the shaft 60 to cause side shifting movement of the fork plate 19 and forks 20 in either direction. The fluid may also be released from both sides of the ram 63 so that the bearing 59 is completely free to slide on the pivot shaft 60. As will be described in detail hereafter, releasing the bearing 59 for free sliding movement allows automatic self-centering of the fork plate 19 and forks 20 relatively to the base plate 18 as the fork plate 19 and forks 20 are retracted through operation of the rams 38 and 39.

*Operation*

The structural features of the invention having been described, a description of a typical operation utilizing the arrangement of the invention will be described. Assuming that the fork plate 19 and forks 20 are in a completely retracted position, as shown in the full lines in FIGS. 1 and 2, and also in FIGS. 3 and 5, and that it is desired to pick up a pallet-supported load that is too wide for the legs of the truck to straddle, the truck is first positioned approximately in front of the load. The side shifting ram 63 is then locked to hold the bearing 59 in the centered position and the rams 38 and 39 operated to effect folding movement of the arms to extend the fork plate 19 and the forks 20 until the forks 20 enter the pallet of the load. It will be appreciated that the fork plate 19 and forks 20 are shown in broken lines in FIGS. 1 and 2 in only a partially extended position, and that in fully extended position they extend completely beyond the ends of the legs of the truck. After insertion of the forks 20 into the pallet, and before the forks are lifted to accept the load, the side shifting ram 63 is operated to side shift the forks 20 as necessary to accurately center the forks relatively to the loaded pallet.

The load carriage is then elevated through operation of the elevating ram 15 to lift the forks and load until they are in a position above the legs of the truck. Fluid pressure is then released from the side shifting ram 63, and the rams 38 and 39 are operated to fold the arms 21 and 22 to retract the forks 20 and the loaded pallet supported thereon. It will be noted that when the arms are folded against the base plate 18 as the fork plate 19 and forks 20 are retracted, the fork plate and forks are automatically shifted toward a centered position due to the geometry of the arms 21 and 22 until, when in a fully retracted position, they are completely centered, as best shown in FIG. 5. During such centering movement, the bearing 59 slides freely on the shaft 60 due to the release of pressure on the side shifting ram 63. The load therefore being previously centered relatively to the forks, and the forks being centered relatively to the truck when in fully retracted position, the load is thereby accurately centered relatively to the truck and lateral overhang of the load relatively to the truck is minimized. A fluid pressure source and suitable valves (not shown) for operating the rams 38, 39 and 63 in the desired manner are of course provided.

From the preceding description, it can be seen that there is provided a simple, inexpensive arrangement for both extending and retracting the forks or load support of an industrial truck and for side shifting the forks or load support. As the forks are supported by the same arms during both extending and side shifting movement, separate guiding and supporting structures for guiding and supporting the forks during the two different movements are not necessary. The arrangement of the invention also provides automatic centering of the forks relatively to the truck when the forks are retracted, to thereby provide desired stability to the truck and to minimize lateral overhang of a load supported on the forks.

While one embodiment of the invention has been shown and described, it will be appreciated that this is for the purpose of illustration and that changes and modifications may be made therein without departing from the spirit and scope of the invention.

I now claim:

1. In an industrial truck, a base member, a load support, a pair of folding arms, each arm being pivoted at one end to said base member on a substantially vertical pivot spaced laterally from the vertical pivot of the other folding arm, each arm being pivoted at the other end to said load support on a substantially vertical pivot spaced laterally from the vertical pivot of the other folding arm, each arm being hinged intermediate its ends by a vertical pivot to fold inwardly toward the other arm, means for effecting extension and retraction of said load support relatively to said base member through folding of said arms, and means operatively interconnecting said load support and base member for side shifting said load support relatively to said base member through swinging of said arms in the same direction transversely of said base member.

2. In an industrial truck, a base member, a load support, a pair of folding arms, each arm being pivoted at one end to said base member on a substantially vertical pivot spaced laterally from the vertical pivot of the other folding arm, each arm being pivoted at the other end to said load support on a substantially vertical pivot spaced laterally from the vertical pivot of the other folding arm, each of said pair of folding arms being hinged to fold about a pivot intermediate its ends, ram means extending between and operatively connected with the parts of each arm on opposite sides of said pivot for effecting folding movement of said arms to extend and retract said load support, and means operatively interconnecting said load support and base member for side shifting said load support relatively to said base member through swinging of said arms in the same direction transversely of said base member.

3. In an industrial truck, a base member, a load support, a pair of folding arms, each arm being pivoted at one end to said base member on a substantially vertical pivot spaced laterally from the vertical pivot of the other folding arm, each arm being pivoted at the other end to said load support on a substantially vertical pivot spaced laterally from the vertical pivot of the other folding arm, each of said pair of folding arms being hinged to fold about a vertical pivot intermediate its ends, ram means extending between and operatively connected with the parts of each arm on opposite sides of said pivot for effecting folding movement of said arms to extend and retract said load support, and means operatively interconnecting said load support and base member for side shifting said load support relatively to said base member through swinging of said arms in the same direction transversely of said base member.

4. In an industrial truck, a base member, a load support, a pair of folding arms, each arm being pivoted at one end to said base member on a substantially vertical pivot spaced laterally from the vertical pivot of said other folding arm, each arm being pivoted at the other end to the load support on a substantially vertical pivot spaced laterally from the vertical pivot of the other folding arm, each of said pair of folding arms being hinged to fold about a vertical pivot intermediate its ends, means for effecting extension and retraction of said load support relatively to said base member through folding of said arms, and means mounted on said base member and operatively connected with said load support for side shifting said load support relatively to said base member through swinging of said arms in the same direction transversely of said base member.

5. In an industrial truck, a base member, a load support, a pair of folding arms, each arm being pivoted at one end to said base member on a substantially vertical pivot spaced laterally from the vertical pivot of the other folding arm, each arm being pivoted at the other end to said load support on a substantially vertical pivot spaced laterally from the vertical pivot of the other folding arm, means for effecting extension and retraction of said load support relatively to said base member through folding of said arms, a folding control arm hinged to fold about a horizontal pivot connecting said base member and said load support, means on said base member for moving the end of said folding control arm connected to said base member laterally relatively to said base member whereby side shifting movement is transmitted through said control arm to said load support to side shift said load support through lateral swinging of said pair of folding arms in the same direction transversely of said base member.

6. In an industrial truck, a base member, a load support, a pair of folding arms, each arm being pivoted at one end to said base member on a substantially vertical pivot spaced laterally from the vertical pivot of the other folding arm, each arm being pivoted at the other end to said load support on a substantially vertical pivot spaced laterally from the vertical pivot of the other folding arm, means for effecting extension and retraction of said load support relatively to said base member through folding of said arms, a folding control arm hinged to fold intermediate its ends about a horizontal pivot and pivotally connected at its ends by horizontal pivots to said base member and said load support, means on said base member for moving the end of said folding control arm connected to said base member laterally relatively to said base member whereby side shifting movement is transmitted through said control arm to said load support to side shift said load support through lateral swinging of said pair of folding arms in the same direction transversely of said base member.

7. In an industrial truck, a base member, a load support, a pair of folding arms, each arm being pivoted at one end to said base member on a substantially vertical pivot spaced laterally from the vertical pivot of the other folding arm, each arm being pivoted at the other end to said load support on a substantially vertical pivot spaced laterally from the vertical pivot of the other folding arm, each arm being hinged intermediate its ends by a vertical pivot to fold inwardly toward the other arm, means for effecting extension and retraction of said load support relatively to said base member through folding of said arms, a folding control arm hinged to fold intermediate its ends about a horizontal pivot and pivotally connected at its ends by horizontal pivots to said base member and said load support, means on said base member for moving the end of said folding control arm connected to said base member laterally relatively to said base member whereby side shifting movement is transmitted through said control arm to said load support to side shift said load support through lateral swinging of said pair of folding arms in the same direction transversely of said base member.

8. In an industrial truck, a base member, a load support, a pair of folding arms, each arm being pivoted at one end to said base member on a substantially vertical pivot spaced laterally from the vertical pivot of the other folding arm, each arm being pivoted at the other end to said load support on a substantially vertical pivot spaced laterally from the vertical pivot of the other folding arm, each arm being hinged intermediate its ends by a vertical pivot to fold inwardly toward the other arm, a ram extending between and operatively connected with the parts of each arm on each side of said pivot for effecting folding of each arm to extend and retract said load support, a folding control arm hinged to fold intermediate its ends by a horizontal pivot and pivotally connected at its ends by horizontal pivots to said base member and said load support, said end of said control arm connected to said base member being slidably mounted on said base member for lateral movement, and ram means on said base member for moving said end of said folding control arm connected to said base member laterally relatively to said base member whereby side shifting movement is transmitted through said control arm to said load support to side shift said load support through lateral swinging of said pair of folding arms in the same direction transversely of said base member.

9. In an industrial truck, a base member, a load support, means supporting said load support on said base member for extension and retraction relatively to said base member, means for effecting extension and retraction of said load support relatively to said base member while maintaining said load support substantially parallel to said base member, means operatively interconnecting said load support and said base member for shifting said load support transversely of said base member when said load support is extended and for centering said load support relatively to said base member as said load support is retracted while said load support is maintained substantially parallel to said base member.

References Cited in the file of this patent
UNITED STATES PATENTS 2,909,299     Quayle _____ Oct. 20, 1959
2,975,923     Ulinski _____ Mar. 21, 1961